US012782506B2

(12) United States Patent
Lore et al.

(10) Patent No.: US 12,782,506 B2
(45) Date of Patent: Nov. 3, 2026

(54) SYSTEMS AND METHODS FOR IN-CABIN SENSOR CALIBRATION

(71) Applicant: Veoneer US, LLC, Southfield, MI (US)

(72) Inventors: Pascal Lore, Yokohama (JP); William S. Farmer, Boxborough, MA (US); Todd Stewart, Mont Vernon, NH (US); Robert J. Sletten, Bow, NH (US); Shan Cong, Superior Township, MI (US)

(73) Assignee: Magna Electronics, LLC, Southfield, MI (US)

( * ) Notice: Subject to any disclaimer, the term of this patent is extended or adjusted under 35 U.S.C. 154(b) by 427 days.

(21) Appl. No.: 18/226,760

(22) Filed: Jul. 26, 2023

(65) Prior Publication Data

US 2025/0035743 A1 Jan. 30, 2025

(51) Int. Cl.
*G01S 7/40* (2006.01)
*G01S 13/88* (2006.01)

(52) U.S. Cl.
CPC ................ *G01S 7/40* (2013.01); *G01S 13/88* (2013.01)

(58) Field of Classification Search
CPC ........................................................ G01S 13/88
See application file for complete search history.

(56) References Cited

U.S. PATENT DOCUMENTS 5,977,906 A * 11/1999 Ameen ................. G01S 13/931 342/174
6,226,541 B1 * 5/2001 Eppstein ................. G01J 5/021 600/407
10,528,148 B2 1/2020 Mueller et al.
11,215,695 B2 1/2022 Shen et al.
2010/0042350 A1 * 2/2010 de Wild .................. G01S 13/92 702/96
2018/0267620 A1 9/2018 Mueller et al.
2020/0158840 A1 * 5/2020 Ikram ....................... G06T 7/80
2020/0341113 A1 10/2020 Shen et al.
2020/0355792 A1 11/2020 Tang et al.
(Continued)

FOREIGN PATENT DOCUMENTS

DE 102021104764 A1 * 9/2021 ........... G01S 7/4004
DE 102021111712 11/2022
(Continued)

OTHER PUBLICATIONS

International Search Report—PCTUS2024039847 (3 pgs).
Written Opinion—PCTUS2024039847 (7 pgs).
DE102021111712 Machine Translation (11 pgs).

*Primary Examiner* — Vladimir Magloire
*Assistant Examiner* — Anna K. Gosling
(74) *Attorney, Agent, or Firm* — Matthew D. Thayne; Thayne and Davis LLC

(57) ABSTRACT

Methods and systems for calibrating in-cabin vehicle sensors, such as in-cabin RADAR sensors. In some implementations, the method may comprise detecting a calibration target positioned within a cabin of a vehicle using an in-cabin vehicle sensor. One or more locational parameters of the calibration target relative to the in-cabin vehicle RADAR sensor may then be measured. The in-cabin vehicle sensor may then be calibrated by comparing the detected locational data with predetermined locational data of the calibration target within the vehicle.

18 Claims, 7 Drawing Sheets

(56) References Cited

U.S. PATENT DOCUMENTS

| | | | | |
|---|---|---|---|---|
| 2021/0076971 | A1 | 3/2021 | Oloumi | |
| 2022/0365174 | A1 * | 11/2022 | Mihlin | G01S 7/4086 |
| 2024/0104879 | A1 * | 3/2024 | Jiang | G06V 20/56 |
| 2024/0104941 | A1 * | 3/2024 | Ren | G06V 20/59 |
| 2024/0151092 | A1 * | 5/2024 | Diamond | E05F 15/73 |
| 2025/0001906 | A1 * | 1/2025 | Nelapati | B60N 2/0272 |

FOREIGN PATENT DOCUMENTS

| | | |
|---|---|---|
| EP | 3377359 | 9/2018 |
| EP | 3410145 | 12/2018 |
| EP | 3718797 | 10/2020 |
| EP | 3734319 | 11/2020 |
| EP | 3734324 | 11/2020 |

* cited by examiner

SYSTEMS AND METHODS FOR IN-CABIN SENSOR CALIBRATION

SUMMARY

RADAR is often used to detect objects exterior to a vehicle, such as other vehicles, pedestrians, and obstacles. However, RADAR, or other electromagnetic radiation signals, are not typically directed inward toward occupants of the cabin, let alone to monitor important conditions that may impact the safety of the occupants, such as breathing rates, heart rates, or other vital signs.

When such in-cabin electromagnetic signals are used, the precision of the detections is often paramount, due to the relatively small measurements from detections that are often used and the requisite precision to make sure detections. Thus, calibration of in-cabin sensors is of particular importance. Currently, such calibration is expensive and cumbersome, and often requires robotic arms and/or other equipment not typically available at a repair shop.

The present inventors have therefore determined that it would be desirable to provide systems and methods that make calibration of in-cabin sensors more simple, quick, and/or inexpensive, and/or that overcome other limitations of the prior art. Systems and methods for improved calibration of in-cabin sensors are therefore disclosed herein.

In a more particular example of a method for calibrating an in-cabin vehicle sensor, such as an in-cabin RADAR sensor, the method may comprise detecting a calibration target positioned within a cabin of a vehicle using an in-cabin vehicle sensor; measuring one or more locational parameters of the calibration target relative to the in-cabin vehicle sensor; and calibrating the in-cabin vehicle sensor using predetermined locational data of the calibration target within the vehicle.

Some implementations may further comprise, before the step of detecting the calibration target, temporarily placing the calibration target within the vehicle and, following the step of calibrating the in-cabin vehicle sensor, removing the calibration target from the vehicle.

In some implementations, the calibration target may comprise a coupling piece configured to facilitate temporary placement of the calibration target to a respective component of the vehicle. In some such implementations, the coupling piece may comprise a seatbelt clip configured to engage with a seatbelt buckle of the vehicle. In some such implementations, the calibration target may be configured to allow for reorientation of the calibration target within the vehicle with respect to the coupling piece. For example, the calibration target may comprise a universal joint configured to allow for reorientation of the calibration target within the vehicle with respect to the coupling piece.

In some implementations, the calibration target may comprise a corner reflector, such as a reflector having three or more reflective surfaces configured to reflect a signal from an in-cabin RADAR sensor or another in-cabin sensor.

Some implementations may further comprise detecting a second calibration target positioned within the cabin of the vehicle using the in-cabin vehicle sensor and/or measuring one or more locational parameters of the second calibration target relative to the in-cabin vehicle sensor. The step of calibrating the in-cabin vehicle sensor may further comprise using predetermined locational data of the second calibration target within the vehicle.

In some implementations, the calibration target may comprise a permanent fixture within the vehicle. Alternatively, the calibration target may comprise a temporary target. In some such implementations, the calibration target may be configured to be positioned at a particular location within the vehicle.

In some implementations, the calibration target may comprise a vibrational target, such as a speaker. In some such implementations, the step of calibrating the in-cabin vehicle sensor may be performed with the speaker vibrating. In some such implementations, the step of calibrating the in-cabin vehicle sensor may be performed with the speaker vibrating within a predetermined frequency range, or at or at least substantially at a predetermined frequency.

In some implementations, the calibration target may comprise a permanent portion and a temporary portion. In some such implementations, the method may further comprise, before the step of detecting the calibration target, temporarily placing the temporary portion of the calibration target within the vehicle; and following the step of calibrating the in-cabin vehicle sensor, removing the temporary portion of the calibration target from the vehicle. In some such implementations, the permanent portion may comprise a speaker. In some such implementations, the temporary portion may be configured to be mounted to the speaker. In some implementations, the temporary portion may comprise a corner reflector.

Some implementations may further comprise detecting a second calibration target positioned within the cabin of the vehicle using a second in-cabin vehicle sensor; measuring one or more locational parameters of the second calibration target relative to the second in-cabin vehicle sensor; and/or calibrating the second in-cabin vehicle sensor using predetermined locational data of the second calibration target within the vehicle.

Some implementations may further comprise sending the predetermined locational data of the calibration target to the in-cabin sensor from an external calibration console.

In another example of a method for calibrating an in-cabin vehicle sensor, such as a RADAR sensor, the method may comprise initiating a calibration mode of the in-cabin vehicle sensor; detecting a first calibration target positioned within a cabin of a vehicle; detecting a second calibration target positioned within the cabin of the vehicle; calculating bias parameters associated with the first calibration target and/or the second calibration target; and/or calibrating the in-cabin vehicle sensor using the calculated bias parameters.

In some implementations, the first calibration target may comprise a boresight calibration target oriented along a boresight of the in-cabin vehicle sensor. In some implementations, the step of detecting a second calibration target may be performed using a second in-cabin vehicle sensor.

In some implementations, the first calibration target may be positioned at an at least substantially central location within the cabin of the vehicle. In some implementations, the second calibration target may be positioned on a driver-side seat of the vehicle.

In some implementations, the first calibration target and/or the second calibration target comprises a vibrating calibration target. In some such implementations, the first calibration target and/or the second calibration target may comprise a speaker. In some implementations, a target assembly may be provided that comprises both a speaker or other vibrational component with a reflective element, such as a corner reflector.

In an example of a system for calibrating an in-cabin vehicle sensor, such as a RADAR sensor, according to some embodiments, the system may comprise an in-cabin sensor positioned within a cabin of a vehicle; a first calibration target positioned within the cabin of the vehicle; and a calibration module configured to process calibration data obtained using the first calibration target and calibrate the in-cabin sensor.

In some embodiments, the first calibration target may comprise a permanent fixture within the vehicle.

In some embodiments, the first calibration target may comprise a permanent fixture of a seat of the vehicle.

Some embodiments may further comprise a second calibration target positioned within the cabin of the vehicle and/or a second in-cabin sensor positioned within the cabin of the vehicle.

In some embodiments, the calibration module may be configured to detect calibration parameters of the first calibration target using the in-cabin sensor and compare stored calibration parameters of the first calibration target with the detected calibration parameters to calibrate the in-cabin sensor. In some such embodiments, the stored calibration parameters may be stored within a memory component of the vehicle, such as within a memory component of the in-cabin sensor.

In some embodiments, the calibration module may be configured to receive the stored calibration parameters from an external source, such as an external calibration module and/or console.

In some embodiments, the calibration parameters may comprise a range, azimuth, and elevation of the first calibration target relative to the in-cabin RADAR sensor.

In some embodiments, the first calibration target may comprise a vibrating calibration target, such as a speaker of the vehicle. In some such embodiments, the vibrating calibration target may be configured to vibrate at a preconfigured vibrational frequency to facilitate calibration of the in-cabin RADAR sensor.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
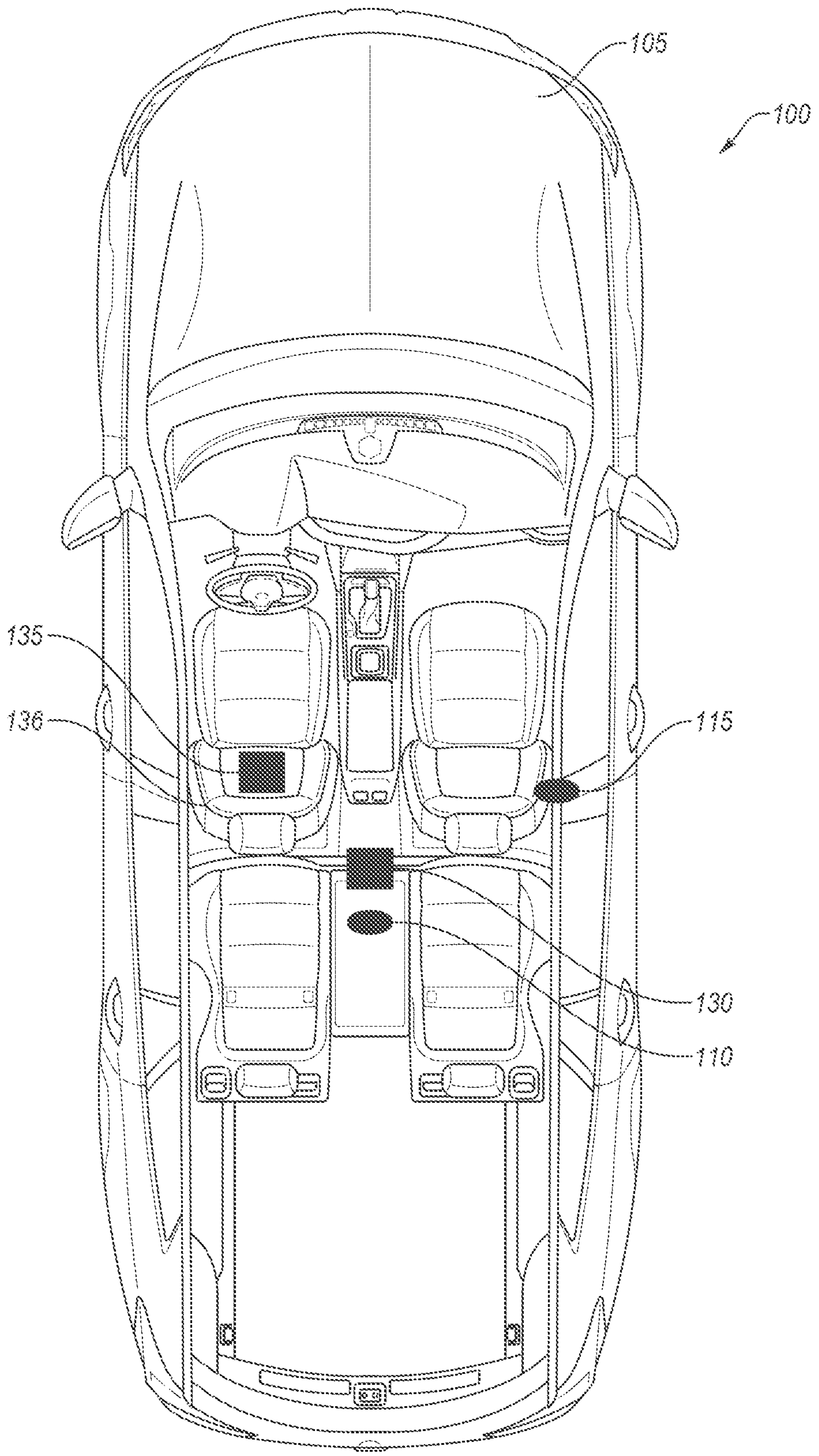
FIG. 1 depicts a vehicle comprising a system for calibration of in-cabin sensors according to some embodiments.

It will be readily understood that the components of the present disclosure, as generally described and illustrated in the drawings herein, could be arranged and designed in a wide variety of different configurations. Thus, the following more detailed description of the embodiments of the apparatus is not intended to limit the scope of the disclosure but is merely representative of possible embodiments of the disclosure. In some cases, well-known structures, materials, or operations are not shown or described in detail.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

FIG. 1 depicts a system 100 for calibration of one or more RADAR sensors within the cabin of a vehicle 105. As shown in this figure, one or more sensors may be positioned at various locations within the cabin of vehicle 105. In the depicted embodiment, vehicle 105 comprises two RADAR sensors 110 and 115. Sensor 110 is positioned at a central location within the cabin of vehicle 105, such as mounted on the ceiling of the cabin at or about the center of the vehicle cabin, and sensor 115 is positioned along a side of the cabin of vehicle 105. In preferred embodiments, sensor 115 may be positioned, for example, at the B-pillar of the frame of vehicle 105. As those of ordinary skill in the art will appreciate, however, a wide variety of alternatives are possible, including different numbers of sensors, different types of sensors, and different locations of sensors.

As previously mentioned, in preferred embodiments, sensors 110 and 115 may comprise RADAR sensors, such as, for example, frequency modulated continuous wave (FMCW) ultra-wide band RADAR sensors configured to operate at 60 GHz. However, in alternative embodiments, other types of sensors may be used, such as LIDAR or other types of electromagnetic sensors, for example. In addition, in some embodiments, only a single sensor may be used.

More than two sensors may also be used in some embodiments. Although it may be preferably to locate the sensors in the roof/ceiling or the upper side of a vehicle pillar, in some such embodiments, or in alternative embodiments having three or fewer sensors, such sensor(s) may alternatively be positioned in the front of the vehicle, the rear of the vehicle, within seats of the vehicle, and/or in the floor of the vehicle, for example.

Each of the various in-cabin sensors, such as sensors 110 and 115, may be configured to direct electromagnetic signals to and/or receive electromagnetic signals from particular regions of the cabin of vehicle 105, preferably so as to at least be capable of detecting occupants within each of the seats of the vehicle 105. Of course, again, many alternatives are contemplated and/or would be available to those of ordinary skill in the art after having received the benefit of this disclosure. For example, a single sensor positioned at a suitable location may, for some vehicles, be sufficient to adequately detect occupants in every seat in the vehicle. Similarly, in other embodiments, it may be desirable to provide a dedicated RADAR or other electromagnetic sensor for each seat of the vehicle.

As described in greater detail below, irrespective of the placement, number, and type of electromagnetic sensors used in the vehicle, in preferred embodiments, such sensor (s) may be used to identify one or more occupants present in the cabin, which may be accomplished, for example, by identifying vital sign data about such occupant(s), such as breathing rates, tidal volume changes, and/or heart rates.

Because of the sensitivity of measurements of vital sign data and/or other data that may be collected using in-cabin RADAR or other sensors, precise calibration of the sensors may be important. To facilitate this process, one or more calibration targets may be positioned in the cabin of vehicle 105.

In the depicted embodiment, a first or primary calibration target 130 may be positioned at a central location within the vehicle, which may be, as shown in FIG. 1, adjacent to sensor 110. In some embodiments, calibration target 130 may be positioned along, or at least substantially along, a boresight axis of a sensor, such as sensor 110. In preferred embodiments, target 130 may be positioned between about 80 and about 120 cm from the center of the sensor 110, again, preferably along the boresight.

One or more secondary calibration targets may also be used. For example, the system 100 of FIG. 1 includes a secondary calibration target 135. Secondary calibration target 135 is coupled with the driver's seat 136 in the depicted embodiment. However, it is contemplated that this and/or other calibration targets may be positioned elsewhere within the cabin of vehicle 105, such as on or within other seats, along or in a door, at another location within the vehicle frame, along a feature of the dash or other portion of the vehicle serving a dual purpose, such as in the steering wheel, within a cup holder, a door handle, and/or along other spots in the cabin ceiling or floor.

In some embodiments, one or more targets may be permanently stamped or otherwise incorporated directly into one or more vehicle seats, such as driver's seat 136, or into another portion of the vehicle, such as within a structural frame, decorative panel, door, ceiling panel, divider, steering wheel, etc. Alternatively, such targets may be temporarily coupled with a suitable location within the cabin of a vehicle. In some such embodiments, the target(s) may comprise means for temporarily coupling the target to one or more specific locations in the vehicle cabin, such as the seatbelt tongues depicted in FIGS. 3A/3B and 5.

In some embodiments of the system 100 depicted in FIG. 1, the secondary calibration target 135 may be positioned at least about 20 cm from the primary calibration target 130. However, as those of ordinary skill in the art will appreciate after having received the benefit of this disclosure, a wide variety of alternative configurations may be employed. Indeed, since greater precision may be obtained using larger distances, in other embodiments a minimum distance of about 1 m between the targets may be used.

Although it is contemplated that calibration targets, such as targets 130 and 135, may be temporarily placed within the cabin of vehicle 105, in preferred embodiments, these targets are permanent fixtures of the vehicle. In this manner, a calibration procedure may be performed using predetermined figures or other parameters, such as pre-established distances between the various sensors and targets and/or pre-established angles, such as azimuth and/or elevation angles.

Such figures/parameters may, in some embodiments, be stored within one or more of the sensors themselves, or within a memory associated with another part of system 100, such as part of the vehicle software. In some embodiments, these values may be hard coded within one or more of the sensors 110, 115. Alternatively, such parameters/figures may be transmitted to the sensors 110 and/or 115, and/or to another part of system 100, during a calibration procedure. For example, if calibration of sensors 110/115 is being performed by an external calibration station, data specific to the vehicle being calibrated and/or the specific locations of the targets within the vehicle may be transmitted from or otherwise used during the calibration procedure by the calibration provider.

Thus, in preferred embodiments, irrespective of whether the data is stored within system 100 and/or vehicle 105 itself or received by system 100 and/or vehicle 105 from an external source, preferably the calibration targets are positioned at locations within the cabin of vehicle 105 that are known/pre-established, such that the various distances and/or angles between the calibration target(s) and sensor(s) can be detected and compared with expected distances and/or angles.

In some embodiments, one or more calibration targets may comprise vibrating targets. In some such embodiments, the one or more calibration targets may be configured, at least during a calibration mode/procedure, to vibrate at a predetermined frequency or at least within a predetermined frequency range. For example, in some embodiments, a frequency corresponding to a typical vital sign frequency that may be used to detect the presence of a vehicle occupant, such as a heart rate or breathing rate, for example, may be mimicked by the vibrational calibration target. Thus, in some embodiments, the vibrational frequency of one or more targets may be between about 0.03 and about 1 Hz.

Examples of in-cabin sensor systems that detect and/or classify vehicle occupants using, for example, vital signs, can be found in U.S. patent application Ser. No. 18/072,662 titled "SYSTEMS AND METHODS FOR VEHICLE OCCUPANT VITAL SIGN DETECTION," which was filed on Nov. 30, 2022, along with U.S. patent application Ser. No. 18/072,662 titled "SYSTEMS AND METHODS FOR VEHICLE OCCUPANT CLASSIFICATION USING IN-CABIN SENSING," which was also filed on Nov. 30, 2022, both of which are hereby incorporated herein by reference in their entireties.

To facilitate this use of vibrational calibration targets, some embodiments may be configured to use the speakers within the vehicle. For example, in some embodiments, speakers may be communicatively coupled with system 100 to allow for emission of a particular tone at a predetermined frequency, or within a predetermined frequency range, during a calibration process. Thus, in some such embodiments, the speakers themselves, or a portion of the speaker housing, frame, or another feature adjacent to one or more speakers, may be configured to facilitate reflection of RADAR signals.

For example, in some embodiments, one or more speakers may be configured with a reflector, such as a corner reflector, which may be configured to facilitate reflection of a transmitted RADAR signal back to a sensor for calibration (either the sensor that transmitted the signal or another sensor part of the same sensor system). In some embodiments, a temporary target, such as a corner reflector, may be temporarily mounted to a speaker, such that the vibration of the speaker may also cause the calibration target to vibrate at the same vibrational frequency.

It should also be understood that, although existing vehicle speakers may be used in some embodiments and implementations, it is also contemplated that temporary speakers may be used in some cases. For example, calibration target assemblies, which in some cases may comprise temporary/mobile calibration target assemblies, may comprise both a reflective element, such as a corner reflector or other element configured to reflect RADAR or other electromagnetic radiation, and a speaker or other vibrational element.

Figure 2:
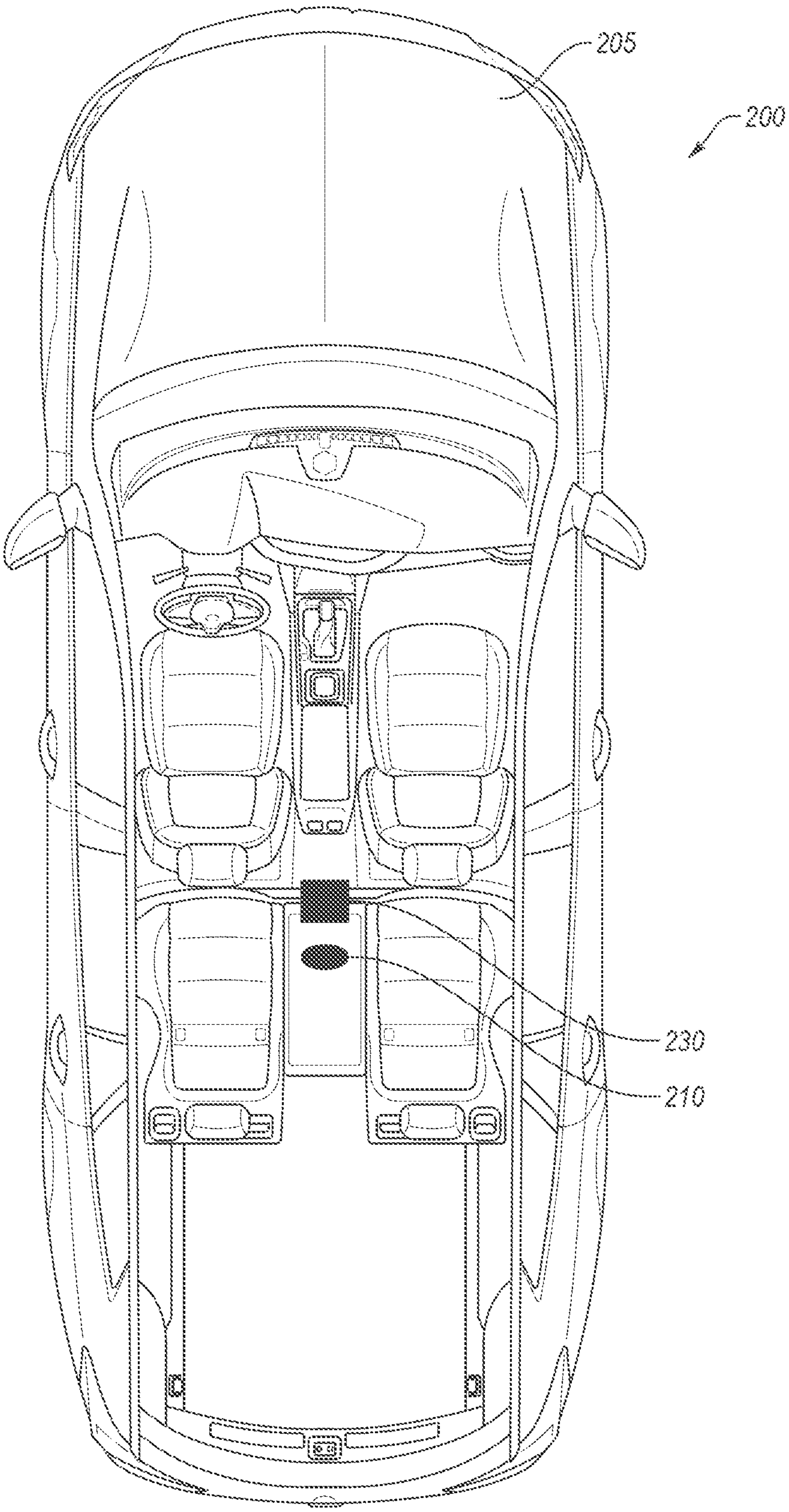
FIG. 2 depicts an alternative embodiment of a system for calibration of an in-cabin sensor.

FIG. 2 illustrates an alternative embodiment of a system 200 for calibration of a RADAR sensor 210 within the cabin of vehicle 205. As shown in this figure, some embodiments may be configured to utilize only a single RADAR sensor 210 within the cabin of vehicle 205, along with a single calibration target 230.

In the embodiment of FIG. 2, sensor 210 is shown positioned at a central location within the cabin of vehicle 205, such as mounted on the ceiling of the cabin at or about the center of the vehicle cabin. However, as mentioned above, sensor 210 may be located at any other desired location within the cabin of vehicle 205, such as, for example, within the ceiling, floor, or another structural element of the vehicle 205 as desired.

Similarly, although calibration target 230 is also shown as positioned centrally within the vehicle, it is contemplated that it may be located at a variety of alternative locations within the cabin of vehicle 205. For example, calibration target 230 may be incorporated into another structural and/or functional element of the vehicle, such as a cup holder, door handle, steering wheel, seat belt, door frame, seat frame, or the like. As previously mentioned, some embodiments may be configured for temporary placement of one or more calibration targets during a calibration procedure, but in preferred embodiments the one or more calibration targets may be permanent fixtures within the vehicle, which may avoid calibration errors caused by displacement of calibration targets that may be more likely when temporary targets are utilized.

Figure 3B:
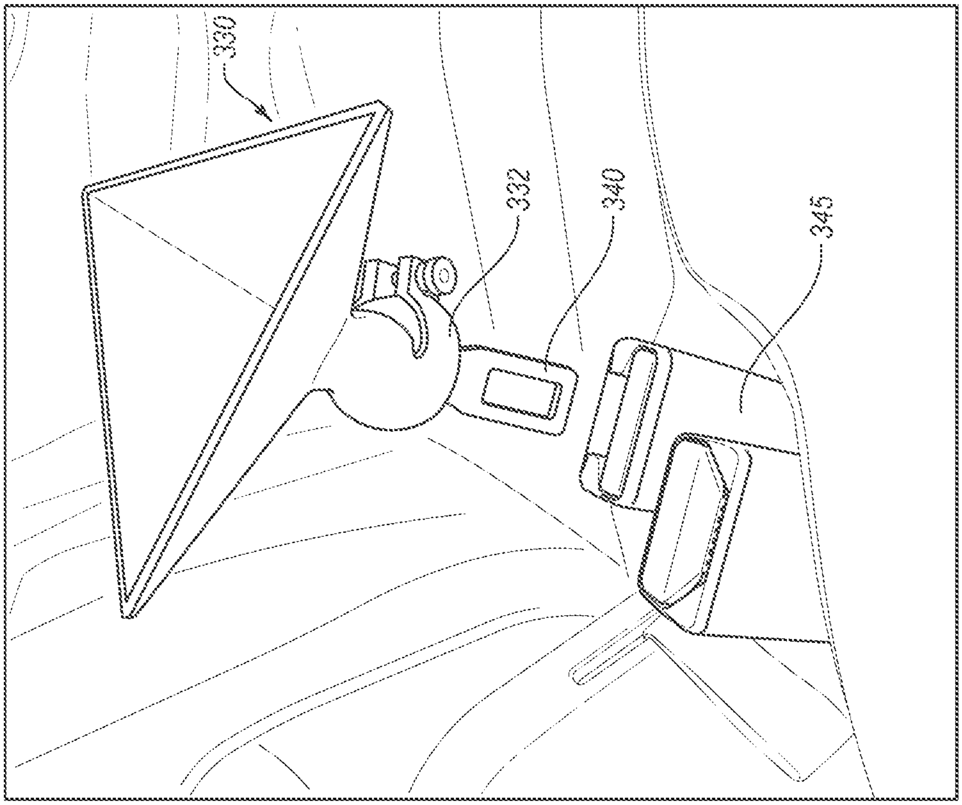
FIGS. 3A and 3B depict an example of a temporary calibration target according to some embodiments.
Figure 3A:
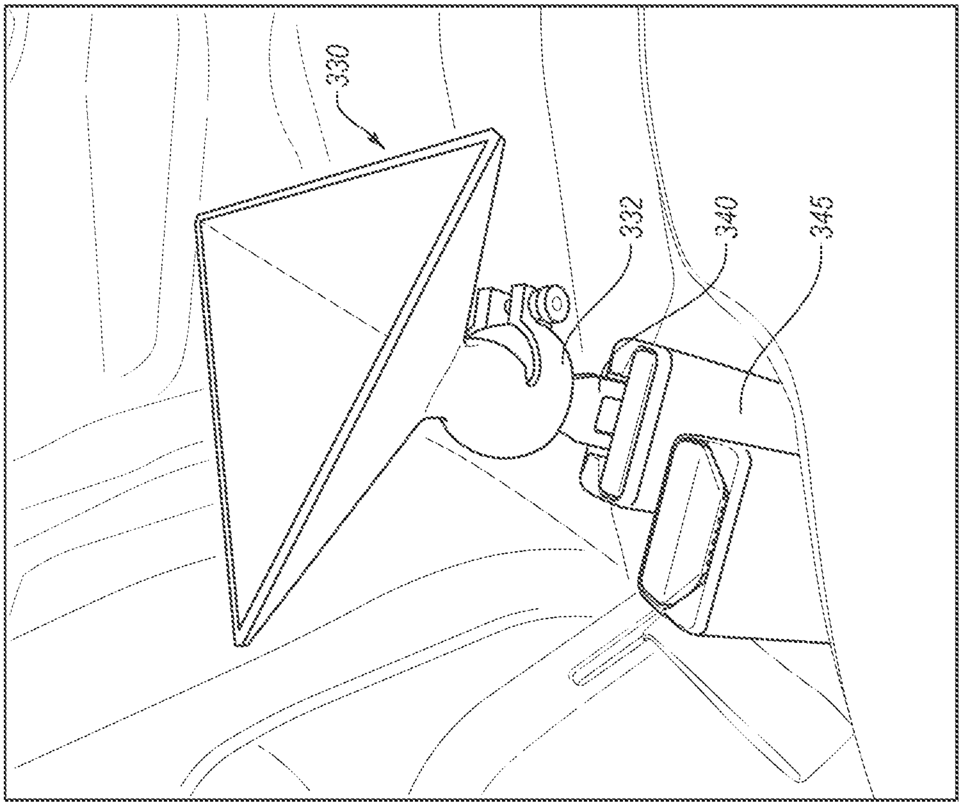

FIGS. 3A and 3B depict an example of a calibration target 330 according to some embodiments. These figures illustrate two exemplary features of calibration target 330, one or both of which may be incorporated into any of the various other embodiments disclosed herein.

More particularly, calibration target 330 comprises a corner reflector target. This configuration may comprise three flat, reflective surfaces, each of which may, for example, comprise a triangular shape (as shown in FIG. 3), or a rectangular shape. These surfaces may be configured to facilitate multiple reflections of an incoming RADAR signal and ultimately to reflect the signal back to an antenna/sensor, such as the transmitting sensor.

Calibration target 330 also is coupled with a means for temporarily coupling the target 330 with a vehicle structure, which coupling means in the depicted embodiment comprises a seatbelt clip or tongue 340 configured to engage a seatbelt buckle 345. Thus, FIG. 3A depicts the seatbelt tongue 340 being partially inserted into the buckle 345 and FIG. 3B depicts the seatbelt tongue 340 removed from the buckle 345.

However, it should be understood that this is only an example. Calibration target 330 may therefore be incorporated into a variety of alternative vehicle structures, as mentioned above, including structural elements and functional elements of existing vehicles. Because target 330 is shown as incorporated into a seatbelt clip or tongue 340, it may be better suited as a temporary target that may be temporarily used, for example, by a repair shop or the like.

However, it should also be understood that this is but an example, and that the principles conveyed by this example may be extended into a variety of alternative embodiments and systems. For example, a reflector, and in some cases a corner reflector, may instead be permanently incorporated into a structure, such as a structural or functional structure, of a vehicle, to facilitate calibration of in-cabin sensors. For example, a corner reflector may be incorporated into another portion of the vehicle where a similar structure may already be present or may be readily placed without interference with the comfort of the occupants within the cabin, such as stamped within a vehicle door or vehicle seat, positioned within a headrest, or incorporated into a portion of the vehicle frame.

In some embodiments, the target, such as corner reflector target 330, may comprise a thermoplastic material, such as a 3D-printed material. Preferably, however, when such materials are used, they may be metalized in order to enhance reflectivity. For example, metalized plastics may be used. Alternatively, metal, or metalized films or layers may be added to the target. In still other embodiments, however, the target may instead be made up of a suitable metal/reflective material.

Because the orientation of the target may be critical, some embodiments may comprise a means for adjustment of the orientation of the target. For example, target 330 comprises a universal joint 332, which may allow for the orientation of the target 330 towards the sensor(s) to be adjusted for calibration. Universal joint 332 may allow for adjustment of the orientation of the target 330 along two, or in some cases three, axes. Of course, other adjustment means may only require adjustment in a single axis and/or plane. However, in other embodiments, as discussed below, it may be preferred to provide a fixed reflector/target orientation within the vehicle.

Figure 4:
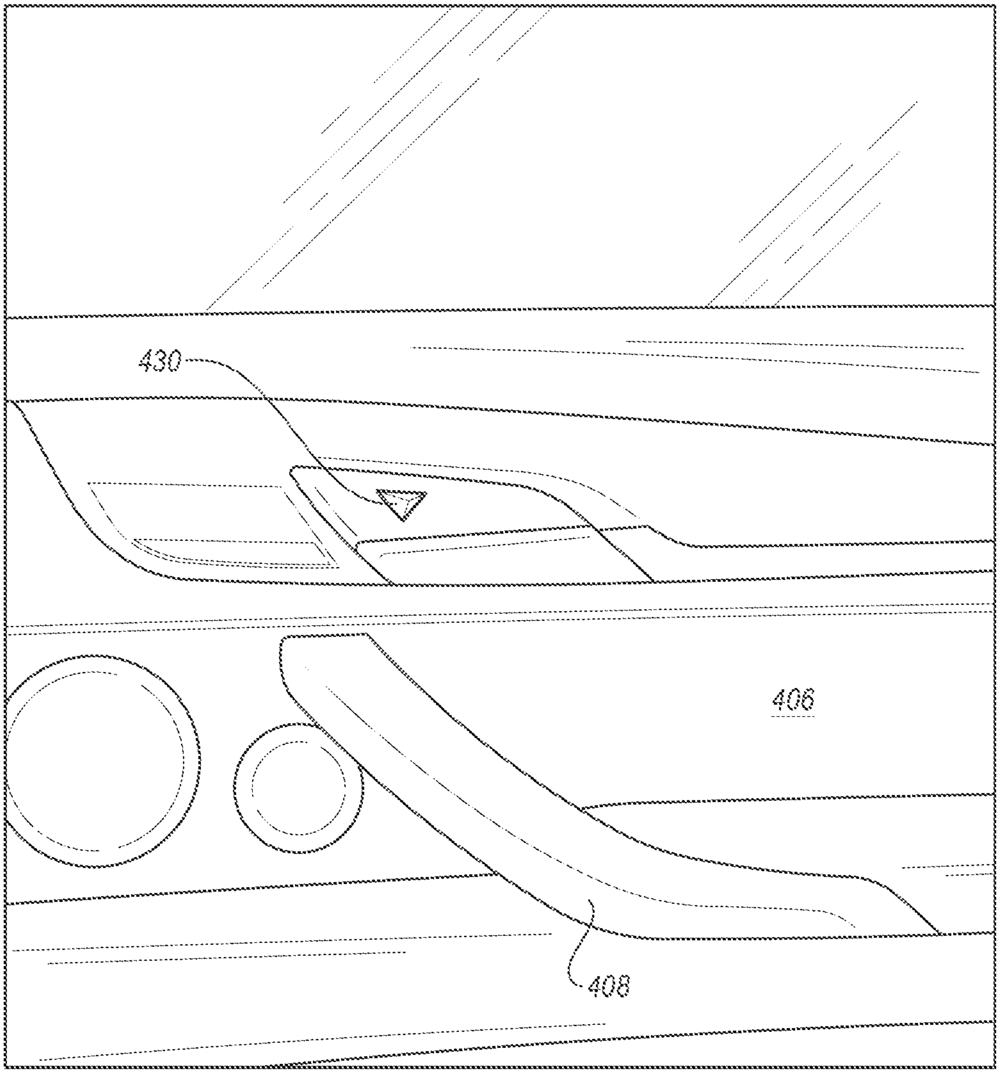
FIG. 4 depicts a calibration target incorporated into a door of a vehicle according to some embodiments.

FIG. 4 illustrates an example of a fixed calibration target 430 within the cabin of a vehicle. In this example, calibration target 430 is incorporated within door 406 of the vehicle. More particularly, in this example, calibration target 430 is incorporated into the door frame. Target 430 may be incorporated into the door 406 during manufacturing or may be added as a later modification to facilitate sensor calibration.

However, again, this is but an example. It should be understood that one or more calibration targets may be incorporated into various elements of a vehicle to allow for reflection to, and calibration of, one or more RADAR or other sensors within the vehicle. For example, calibration targets may be incorporated into a door handle of the vehicle, within a seat (such as within the seat frame, below the seat, or within a headrest of the seat), elsewhere within door 406 (such in a door armrest 408), within another door of the vehicle, within an instrument panel, steering wheel, or elsewhere as desired. When incorporated within a vehicle in this manner, preferably the calibration target 430 is fixed in an orientation that provides for good reflection energy of signals from the sensor(s) during calibration. However, it is possible that calibration target 430 may be configured to allow for some adjustment in any of these locations, if desired.

Also, although only a single calibration target 430 is shown in FIG. 4, it should also be understood that, for some calibration systems, full calibration may require the use of two calibration targets. Thus, two fixed calibration targets may be provided or, alternatively, one or more temporary calibration targets may be used, one or more of which may be relocated during calibration, if needed. It should also be understood that multiple sensors may be used in some systems, as previously mentioned.

Figure 5:
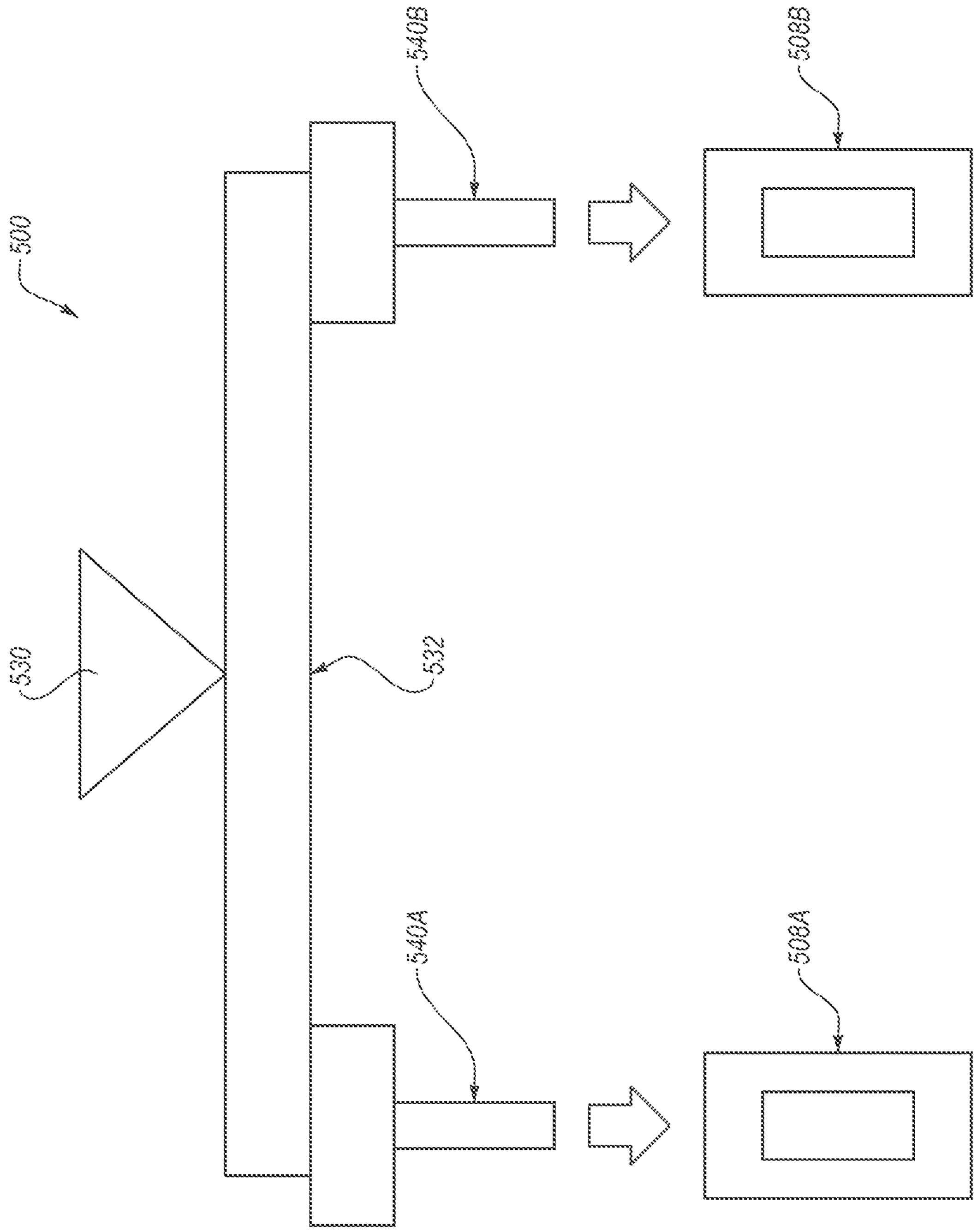
FIG. 5 illustrates another example of a system for calibrating in-cabin vehicle sensors according to some embodiments.

A portion of another alternative calibration system 500 is shown in FIG. 5. In this system 500, a temporary calibration target 530 may be used that is configured to be temporarily installed during a calibration process (likely by a repair shop or the like). Because calibration target 530 is configured to be coupled with two seatbelt buckles 508A and 508B, it may be more stable than temporary targets configured to couple with a single seatbelt buckle, such as target 330.

In order to accomplish this dual coupling, which may avoid the need for a universal joint or other adjustment means, calibration target 530 comprises a frame 532 having two seatbelt tongues 540A/540B extending therefrom, each of which is configured to engage a separate, respective seatbelt buckle 508A/508B.

As shown in FIG. 5, preferably the target 530 comprises a corner reflector (although alternative embodiments are contemplated in which this need not be the case). Moreover, the target 530 may be positioned at a central, or at least substantially central, location relative to the two seatbelt tongues 540A/540B, although, again, other embodiments are contemplated in which the target portion of the assembly shown in FIG. 5 may be positioned elsewhere and/or the various coupling pieces (there may be fewer or greater than two) may extend at locations on the frame that facilitate coupling with particular seatbelt buckles or other vehicle cabin features.

Figure 6:
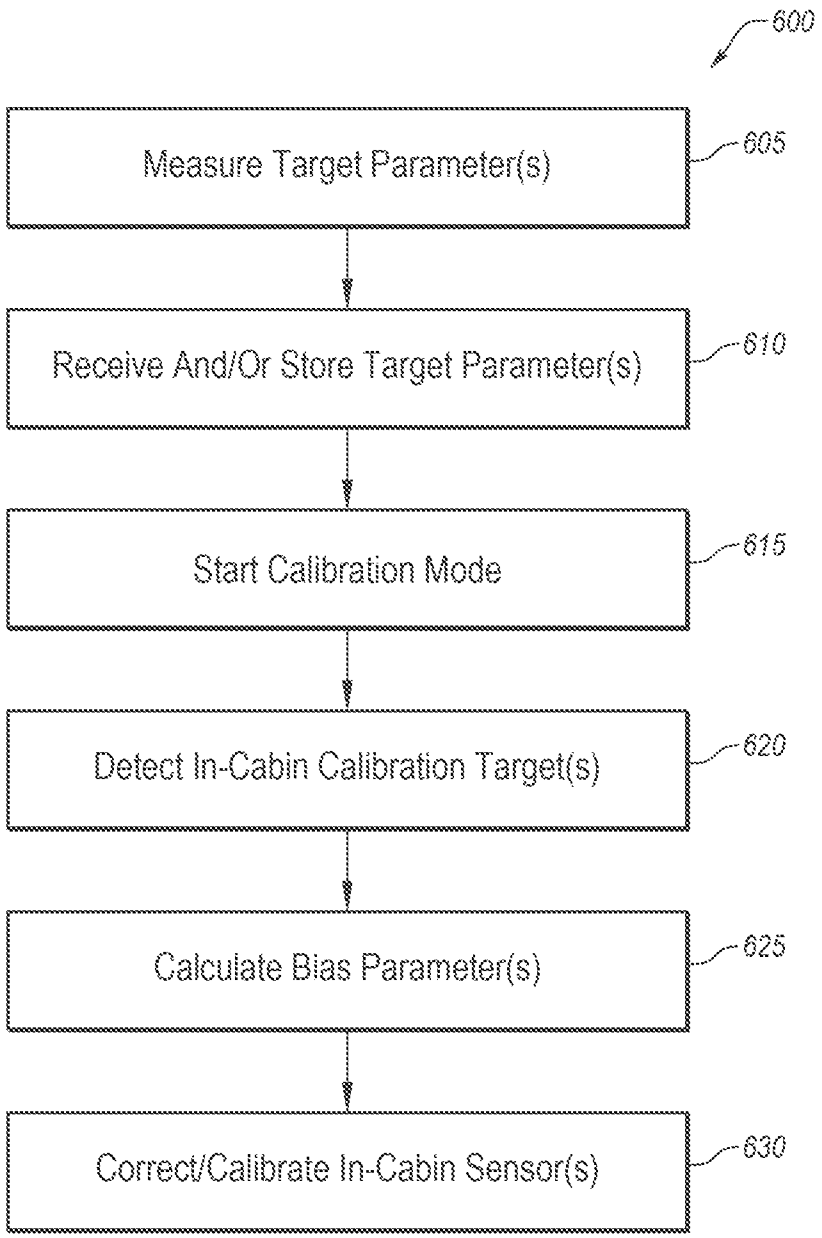
FIG. 6 is a flow chart depicting an example of a method for calibrating one or more in-cabin sensors according to some implementations.

FIG. 6 is a flow chart depicting an example of a method 600 for calibration of RADAR or other in-cabin vehicle sensors according to some implementations. In some implementations, this calibration method 600 may be used to calibrate sensors configured to use electromagnetic radiation to detect vehicle occupants, such as those used to detect and/or estimate a vital sign of a vehicle occupant.

Method 600 may begin with the measurement of calibration target parameters at 605. In some implementations, the calibration target parameters may comprise the range/distance(s), azimuth angle(s), and/or elevation angle(s) of one or more in-cabin sensors relative to one or more in-cabin calibration targets for a particular vehicle configuration.

These parameters may, in some implementations, be hard coded or otherwise stored in the sensor(s), or in a related system communicatively coupled with the sensor(s) of a vehicle. Alternatively, this data may be transmitted to the vehicle during a calibration procedure, such as from a repair shop or the like using figures corresponding to a particular make and model of a vehicle. Thus, some implementations may omit step 605, which may have been performed once for a particular vehicle and then used during calibration procedures without specifically performing the measurements again.

Once the target parameters have been obtained, in some implementations of method 600, they may be received by a sensor or another component of the calibration system and/or stored within a component of the calibration system and/or vehicle at 610. Again, this may be done before a typical calibration procedure and therefore need not be part of a typical calibration method but is being described for sake of completeness and to describe some, more comprehensive implementations that include one or more steps that need not be performed in connection with every calibration procedure.

In some implementations, step 610 may comprise receiving calibration target parameters, such as range(s), azimuth angle(s), and/or elevation angle(s) of one or more calibration targets relative to one or more RADAR or other in-cabin sensors. In some embodiments, step 610 may comprise receiving calibration target parameter data relating to a plurality of calibration targets and/or a plurality of in-cabin sensors. In some implementations, this data may be transmitted, either wirelessly or via a wired connection, for example, from a manufacturer or calibration/repair shop or the like. This data may be received once and then stored within the sensor(s) and/or elsewhere in the vehicle for later calibration or may be received during or immediately prior to a calibration procedure.

In some implementations, step 610 may further, or alternatively, comprise storing target parameter data obtained and/or stored apart from any particular calibration procedure. For example, some vehicles may comprise permanent calibration targets and may therefore be pre-programmed with calibration data about such calibration targets during manufacturing, or during installation of a calibration system on a particular vehicle. In some such implementations, the calibration target parameter data may be stored within memory, such as preferably non-volatile memory, on the sensor(s) themselves.

At step 615, the calibration mode may begin. In some implementations, this step may be the first step in a calibration method involving use of pre-existing components, such as calibration targets and in-cabin sensors, within a particular vehicle. In some implementations, step 615 may comprise connecting a vehicle comprising in-cabin sensors to a calibration console, which may be, for example, a calibration console of a dealer and/or repair/calibration shop, for example. This connection may be wireless or may comprise connecting communication cables to the in-cabin sensors or another electrical component of the vehicle. Alternatively, step 615 may simply comprise actuating a calibration procedure on an internal vehicle system on which calibration parameters for one or more calibration targets have been pre-stored.

At step 620, one or more in-cabin sensors of the vehicle may then be used to detect one or more calibration targets in or on the vehicle. In some implementations, these calibration targets may be positioned in particular, predetermined locations within the vehicle immediately prior to the calibration process (rather than during manufacturing or installation of the in-cabin sensors and/or a calibration system, for example). Thus, in some such implementations, step 620 may further comprise positioning one or more temporary calibration targets within the vehicle at predetermined, preferably precise, locations within the cabin of the vehicle prior to detecting them.

More generally, step 620 may comprise detecting or measuring various current target parameters (as opposed to the known/ideal/stored target parameters mentioned in step 605 and 610). These parameters preferably match the ideal/stored parameters to allow for comparison and calculation of calibration bias, as discussed below. Thus, the measured data collected in step 620 may again comprise, for example, range, azimuth angle, and/or elevation angle of preferably each in-cabin sensor relative to one or more (in some cases, each) calibration target.

The bias parameters of each calibration target relative to one or more (in some cases, each) of the in-cabin sensors may then be calculated at step 625. In some implementations, this step may comprise comparing each of the known/recorded position(s) (e.g., range, azimuth, and elevation) of the in-cabin sensor(s) to the measured position(s) of each of the calibration targets from one or more in-cabin sensors and storing the difference between each of the detected/measured parameters as bias parameters. These parameters may be stored in any desired location on the vehicle, such as on a memory component of the in-cabin sensors themselves, or another element of the vehicle and/or calibration system.

Each of the one or more in-cabin sensors may then be calibrated using the bias parameters at 630. In some implementations, the bias parameter data may be used for all subsequent detections using the in-cabin sensor(s) to correct any discrepancies caused by the bias/errors. Such bias/discrepancies may have originated, for example, from misalignment or other mistakes made during installation of the sensor(s), or by errors introduced following installation, such as, for example, by environmental factors or damage caused by wear and tear. Following calibration, the in-cabin sensor(s) may then be moved from calibration mode to normal operation mode for further use.

Figure 7:
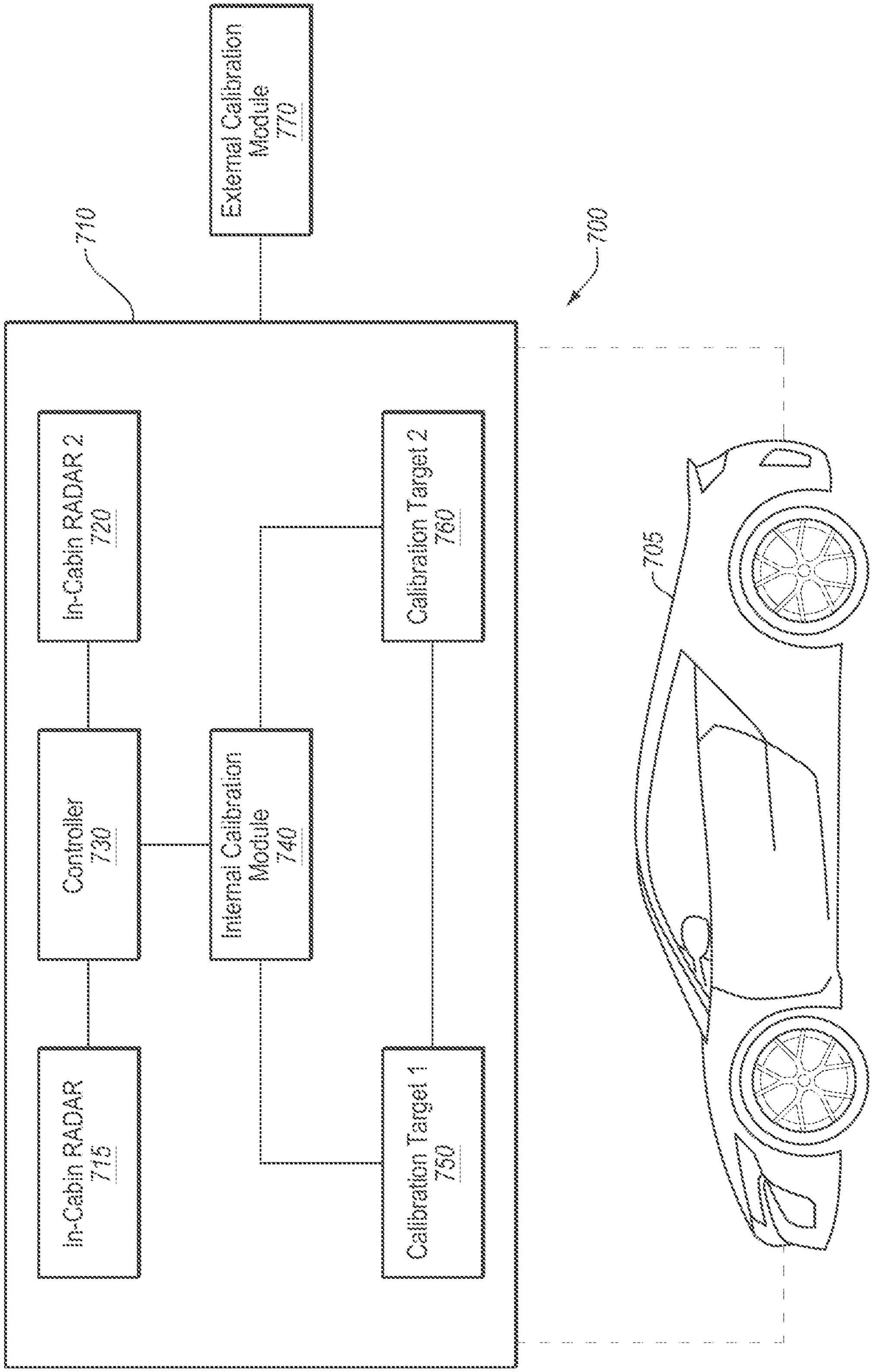
FIG. 7 depicts an example of a vehicle comprising a system for calibration of one or more in-cabin vehicle sensors according to some embodiments.

FIG. 7 illustrates an example of a system 700 for calibrating one or more in-cabin sensors, such as in-cabin RADAR sensors, in a vehicle 705 according to some embodiments. System 700 may comprise an internal system 710, which may combine a combination of various hardware, software, firmware, and the like as desired. System 710 comprises a first in-cabin RADAR or other sensor 715 and a second in-cabin RADAR or another sensor 720. Those of ordinary skill in the art will appreciate that, although two sensors are shown in the depicted embodiment, the number of sensors may vary as desired without departing from the primary inventive principles of the system 710, including systems comprising a single sensor and those comprising more than two sensors.

First sensor 715 and second sensor 720 may comprise any number of sensors, such as RADAR sensors, LIDAR sensors, or other sensors configured to send and/or receive electromagnetic radiation, as desired. Sensors 715 and 720 may, in some embodiments, comprise sensor modules comprising various other software, hardware, and/or firmware elements as desired in order to send and receive signals for processing by other modules. Although preferred embodiments may comprise and/or be limited to electromagnetic radiation sensors, it is contemplated that some embodiments may comprise other sensors, which may be used as auxiliary sensors or otherwise to supplement the RADAR or other electromagnet sensors. Such auxiliary sensors may comprise, for example, weight/pressure sensors, temperature sensors, or the like.

System 710 further comprises a controller 730, which may be configured to process data from sensors/sensor modules 715/720. As used herein, the term "controller" refers to a hardware device that includes a processor and preferably also includes a memory element. The memory may be configured to store one or more of the modules referred to herein and the controller 730 and/or one or more processors may be configured to execute the modules to perform one or more processes described herein.

System 710 further comprises an internal calibration module 740 that is communicatively coupled with both of the sensors/senor modules 715/720. Internal calibration module 740 may be configured to use data stored within system 710—such as data hard coded within one or more of the sensors/sensor modules 715/720 or data received from an external source, such as an optional external calibration module 770—representative of the location of one or more calibration targets within the cabin of the vehicle to calibrate the sensors/sensor modules 715/720.

In the depicted example of FIG. 7, calibration targets 750 and 760 are used. However, as mentioned previously, in some embodiments, only a single calibration target may be used. Similarly, in other embodiments, more than two calibration targets may be used. The internal calibration module 740 may use the received and/or stored data, which may comprise parameter data indicative of the location (e.g., in some embodiments, the range, azimuth, and/or elevation angles) of the calibration target(s), along with sensed data obtained by the sensors/sensor modules 715/720 during a calibration procedure, to obtain bias parameter data. This bias parameter data may then be used to correct future detections made by the sensors/sensor modules 715/720 and thereby to calibrate these sensors/sensor modules 715/720 to improve future performance of the sensors/sensor modules 715/720 and/or the system 710.

It should be understood that external calibration module 770 is optional. Indeed, in some embodiments, all data needed to perform a calibration of the in-cabin sensor(s) 715/720 of the vehicle 705 may be stored within system 710. However, in other embodiments, system 710 may be communicatively coupled, either wirelessly or via a wired connection, with external calibration module 770. In some such embodiments, parameter data representative of the location of the calibration target(s) 750/760 within vehicle 705 may be transmitted from external calibration module 770 to system 710 and/or internal calibration module 740, after which the detection of calibration target(s) 750/760 by sensor(s) 715/720 may take place to calculate the aforementioned bias parameters and ultimately calibrate each of the various in-cabin sensors 715/720.

As used herein, a software module or component may include any type of computer instruction or computer executable code located within a memory device and/or m-readable storage medium. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Furthermore, embodiments and implementations of the inventions disclosed herein may include various steps, which may be embodied in machine-executable instructions to be executed by a general-purpose or special-purpose computer (or another electronic device). Alternatively, the steps may be performed by hardware components that include specific logic for performing the steps, or by a combination of hardware, software, and/or firmware.

Embodiments and/or implementations may also be provided as a computer program product including a machine-readable storage medium having stored instructions thereon that may be used to program a computer (or other electronic device) to perform processes described herein. The machine-readable storage medium may include, but is not limited to: hard drives, floppy diskettes, optical disks, CD-ROMs, DVD-ROMs, ROMS, RAMS, EPROMs, EEPROMs, magnetic or optical cards, solid-state memory devices, or other types of medium/machine-readable medium suitable for storing electronic instructions. Memory and/or datastores may also be provided, which may comprise, in some cases, non-transitory machine-readable storage media containing executable program instructions configured for execution by a processor, controller/control unit, or the like.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. A method for calibrating an in-cabin vehicle RADAR sensor, the method comprising the steps of:

detecting a calibration target positioned within a cabin of a vehicle using an in-cabin vehicle RADAR sensor, wherein the calibration target comprises a corner reflector, and wherein the calibration target is configured to be coupled with a seatbelt buckle;

measuring one or more locational parameters of the calibration target relative to the in-cabin vehicle RADAR sensor;

calibrating the in-cabin vehicle RADAR sensor using predetermined locational data of the calibration target within the vehicle;

before the step of detecting the calibration target, temporarily placing the calibration target within the vehicle; and following the step of calibrating the in-cabin vehicle RADAR sensor, removing the calibration target from the vehicle.

2. The method of claim 1, wherein the calibration target comprises a coupling piece configured to facilitate temporary placement of the calibration target to a respective component of the vehicle.

3. The method of claim 1, further comprising:

detecting a second calibration target positioned within the cabin of the vehicle using the in-cabin vehicle RADAR sensor; and measuring one or more locational parameters of the second calibration target relative to the in-cabin vehicle RADAR sensor, wherein the step of calibrating the in-cabin vehicle RADAR sensor further comprises using predetermined locational data of the second calibration target within the vehicle.

4. The method of claim 1, further comprising:

detecting a second calibration target positioned within the cabin of the vehicle using a second in-cabin vehicle RADAR sensor;

measuring one or more locational parameters of the second calibration target relative to the second in-cabin vehicle RADAR sensor; and calibrating the second in-cabin vehicle RADAR sensor using predetermined locational data of the second calibration target within the vehicle.

5. The method of claim 1, further comprising sending the predetermined locational data of the calibration target to the in-cabin RADAR sensor from a calibration console.

6. The method of claim 1, wherein the calibration target comprises a seatbelt tongue configured to engage the seatbelt buckle.

7. A method for calibrating an in-cabin vehicle RADAR sensor, the method comprising the steps of:

initiating a calibration mode of the in-cabin vehicle RADAR sensor;

coupling a first calibration target with a seatbelt buckle within a cabin of a vehicle;

detecting the first calibration target positioned within the cabin of the vehicle;

detecting a second calibration target positioned within the cabin of the vehicle;

calculating bias parameters associated with the first calibration target and/or the second calibration target; and calibrating the in-cabin vehicle RADAR sensor using the calculated bias parameters.

8. The method of claim 7, wherein the first calibration target comprises a boresight calibration target oriented along a boresight of the in-cabin vehicle RADAR sensor.

9. The method of claim 7, wherein the first calibration target is positioned at an at least substantially central location within the cabin of the vehicle, and wherein the second calibration target is positioned on a driver-side seat of the vehicle.

10. The method of claim 7, wherein the first calibration target comprises a corner reflector.

11. The method of claim 10, wherein the first calibration target further comprises a seatbelt tongue, and wherein the step of coupling the first calibration target with the seatbelt buckle comprises inserting the seatbelt tongue into the seatbelt buckle.

12. A system for calibrating an in-cabin vehicle RADAR sensor, comprising:

an in-cabin RADAR sensor positioned within a cabin of a vehicle;

a first calibration target positioned within the cabin of the vehicle, wherein the first calibration target is configured to be coupled with a seatbelt buckle of the vehicle, and wherein the first calibration target comprises a corner reflector; and a calibration module configured to process calibration data obtained using the first calibration target and calibrate the in-cabin RADAR sensor.

13. The system of claim 12, further comprising:

a second calibration target positioned within the cabin of the vehicle; and a second in-cabin RADAR sensor positioned within the cabin of the vehicle.

14. The system of claim 12, wherein the calibration module is configured to detect calibration parameters of the first calibration target using the in-cabin RADAR sensor and compare stored calibration parameters of the first calibration target with the detected calibration parameters to calibrate the in-cabin RADAR sensor.

15. The system of claim 14, wherein the stored calibration parameters are stored within a memory component of the vehicle.

16. The system of claim 12, wherein the calibration parameters comprise a range, azimuth, and elevation of the first calibration target relative to the in-cabin RADAR sensor.

17. The system of claim 12, wherein the first calibration target comprises a vibrating calibration target, and wherein the vibrating calibration target is configured to vibrate at a preconfigured vibrational frequency to facilitate calibration of the in-cabin RADAR sensor.

18. The system of claim 12, wherein the first calibration target further comprises:

a frame;

a first seatbelt tongue coupled with the frame; and a second seatbelt tongue coupled with the frame.

* * * * *